July 23, 1929.　　A. R. THOMPSON　　1,721,752
CANNING APPARATUS
Filed March 26, 1927
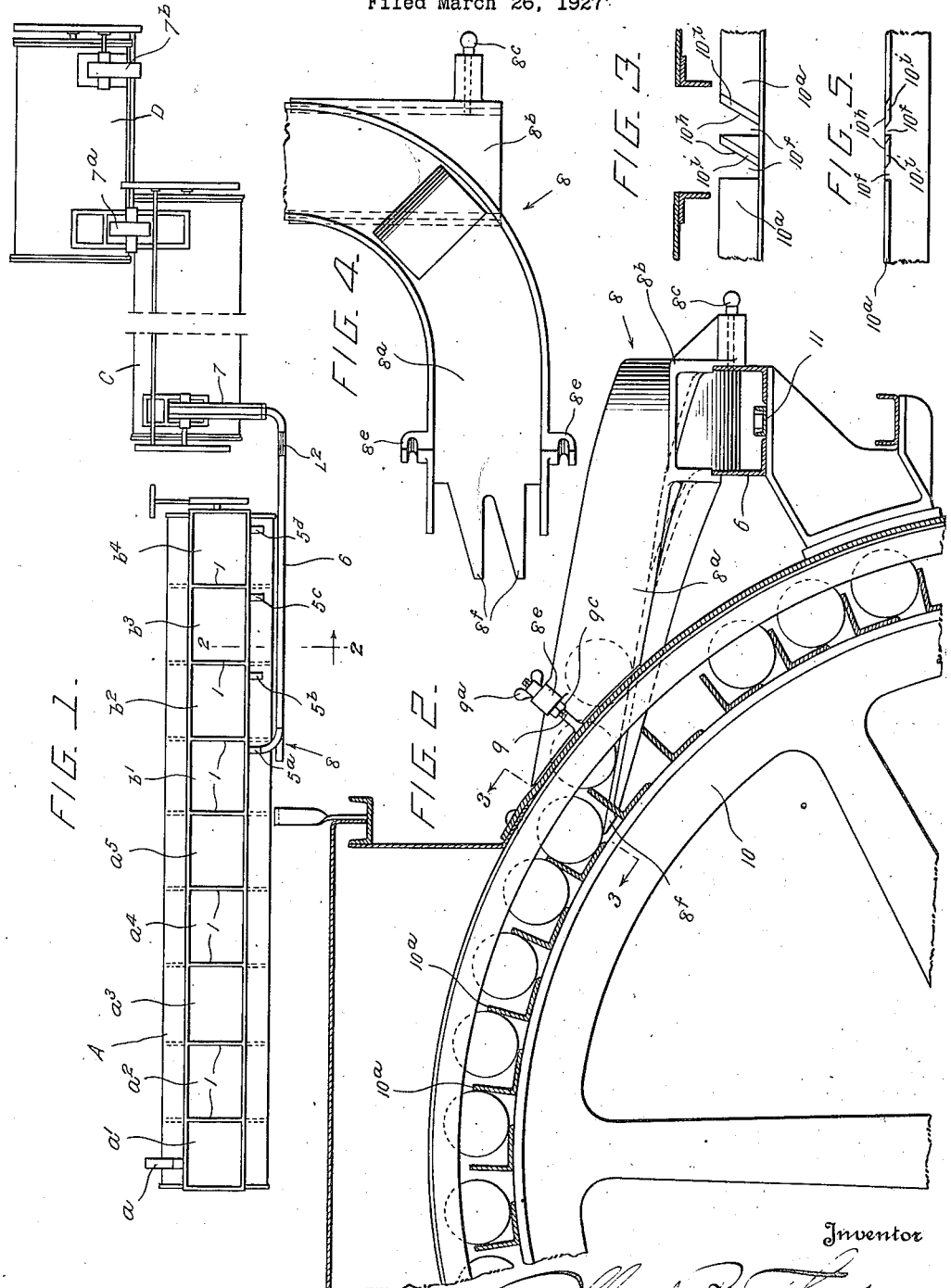

Patented July 23, 1929.

1,721,752

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

CANNING APPARATUS.

Application filed March 26, 1927. Serial No. 178,692.

This invention is an improvement in canning machines or apparatus for cooking or otherwise treating goods in containers.

One object of the invention is to provide an apparatus for use in performing the method of processing condensed or evaporated milk in hermetically sealed containers, as disclosed in my Patent No. 1,491,038 of June 24, 1924, and my companion application filed March 21, 1927, Serial No. 176,983.

A further object of the invention is to provide novel means for varying the time of travel of the cans through a tank or chamber in which they are being treated by varying the point of discharge of the cans from such tank, this object being accomplished by novel adjustable discharge devices whereby cans may be deflected out of the canway in the tank at any one of the plurality of outlet openings in the wall of the tank.

In the accompanying drawings I have diagrammatically illustrated the apparatus, and also illustrated in detail the novel devices for discharging the cans from any one of the various outlet openings of the tank; and I will explain the invention with reference to said drawings, and summarize in the claims the essentials of the invention, and novel features of construction and novel combinations of parts for which protection is desired.

In said drawings:

Figure 1 is a diagrammatic plan view, partly broken, of a novel apparatus for performing the aforesaid method or process;

Fig. 2 is an enlarged detail transverse section on line 2—2, Fig. 1;

Fig. 3 is a detail section on line 3—3, Fig. 2;

Fig. 4 is an enlarged detail plan view showing the adjustable discharge chute;

Fig. 5 is a detail of a notched reel angle bar.

In carrying out the process described in my aforesaid application Serial No. 176,983, I provide an apparatus such as shown in Fig. 1; which comprises a combined preheater and preheat-holder A, a cooker or sterilizer C, and a cooler D, through all of which the cans are successively passed.

The shells or tanks of the preheater, combined preheater and preheat-holder, sterilizer, and cooler, may each be constructed, if desired, like the tanks shown in my Reissue Patent No. 15,996; and steam heat may be applied to the combined preheater and preheat-holder, and sterilizer in like manner.

The combined preheater and preheat-holder A, sterilizer C and cooler D, are each preferably provided with a spiral canway and a reel for moving the cans therethrough, such as shown for example in my Patent No. 1,172,501 of February 22, 1916. Preferably the several tanks are approximately circular and the spiral canways are attached directly to the walls thereof, as in my Reissue Patent No. 15,996 of February 10, 1925.

The combined preheater and preheat-holder A is divided into a plurality of compartments by suitable partitions, which may be such as shown in my Patent No. 1,385,594 of July 26, 1921, or Reissue No. 15,334 of April 11, 1922; or the compartments may be formed by interior partitions within and moving with the reel, as in my Patent No. 1,498,765, or No. 1,499,038.

As shown the left hand portion of the combined preheater and preheat-holder A has spaced internal partitions 1, which divide the left hand portion thereof into five chambers or compartments, $a^1$, $a^2$, $a^3$, $a^4$, $a^5$, through which the cans are successively passed. In treating canned milk the temperature of the compartments are preferably as follows,—the first compartment approximately 110° F.; the second compartment 140° F.; the third compartment 160° F.; the fourth compartment 180° F. and the fifth 200° F., so that the cans passing successively through these compartments are gradually increased in temperature.

The right hand portion of the combined pre-heater and preheat-holder is maintained at a uniform temperature of about 210° F.; and preferably, as shown, is divided by partitions 1 into four compartments or chambers $b^1$, $b^2$, $b^3$, $b^4$, each of which when used should be heated to a temperature of about 210° F. The preheated cans after being passed successively through all the chambers $a^1$ to $a^5$, are passed through one or more of the compartments $b^1$ to $b^4$, as desired.

The cans may be discharged from any one of the chambers $b^1$ to $b^4$ as desired through their respective outlets $5^a$, $5^b$, $5^c$, or $5^d$ into a chute 6 by which they are directed to the inlet valve 7 of the sterilizer C, from which they are discharged through valve $7^a$, into the cooler D, and are finally discharged from this cooler through valve 7$^b$, as described in my aforesaid application.

In heating canned milk a uniform temperature of about 240° F. is maintained in the sterilizer C, and a temperature of about 150° F. or less is maintained in cooler D. As the temperature in the sterilizer is above 212°, a pressure above atmospheric should be maintained in the sterilizer; and also in the cooler; to prevent the cans bursting from internal pressure therein; and the cans should not be exposed to the atmosphere in passing from the sterilizer into the cooler.

A leaky can detector L$^2$ of any suitable construction is placed between the preheat-holder and the sterilizer, so that regardless of where the cans are discharged from the preheat-holder, they will have to pass through the detector.

In the treatment of milk by the process described in my aforesaid application the cans are fed into the machine at $a$ and passed through the several heating regions $a^1$, $a^2$, $a^3$, $a^4$ and $a^5$, which are maintained at different temperatures, until they reach the first outlet 5$^a$, the temperature of the heat holding chambers being 210° F. The cans may be discharged from this chamber at 5$^a$ or may be allowed to pass on to the next outlet 5$^b$, or they may go to the third, or whichever discharge the operator may select. The temperature in this preheat holding portion of the apparatus from the first outlet 5$^a$ to the last outlet 5$^d$ is held substantially constant at approximately 210° F. The operator, after determining the character of the milk which is being handled, will select the outlet best adapted for the particular milk being treated.

My invention provides novel means by which the cans may be discharged from the preheat holder at any desired outlet 5$^a$, 5$^b$, 5$^c$, or 5$^d$, according to the desired length of time of treatment of the cans prior to their discharge into the sterilizer. This means includes a novel adjustable discharge chute 8 (see Figs. 2 and 4).

The discharge chute 8 may be of cast metal, and in the construction shown has an arched base portion 8$^b$ which is adapted to rest upon and project over the top of the canway 6, as shown in Fig. 2, and from this base portion 8 extends a part 8$^a$ which is U-shaped in cross section, and extends at a curve of approximately 90°. The part 8 is provided with a slidable pin catch 8$^c$, which is adapted to engaged a notch or aperture in the side of the canway adjacent the outlet opening to hold the discharge chute in position thereon. Near its inner end the part 8$^a$ is provided with lugs 8$^e$ on its outer sides which are adapted to be engaged with studs 9 attached to the wall of the tank at opposite sides of each inlet opening therein, and the lugs may be clamped to the stud by thumb nuts 9$^a$ as indicated in Fig. 2 thus securing the chute in place. The inner end of the chute is provided on its bottom with stripping fingers 8$^f$, which are preferably bevelled as shown and are adapted to project into the path of the angle bars 10$^a$ on the reel 10. These angle bars 10$^a$, however, are provided with notches 10$^f$ (see Fig. 3), so located as to register with the stripping fingers 8$^f$ and permit the stripping fingers to project into the path of the cans, and cause the cans to roll out of the canway through the outlet openings into the chute; as indicated in Fig. 2.

The chute 8 is movable from one outlet opening to another and is placed at that opening, selected by the operator, at which the cans are to be discharged from the preheat-holder. The studs 9 receive and support the feed end of the chute, and the adjustable nuts 9$^c$ on the studs definitely determine the height of the stripping fingers 8$^f$ relative to the reel. The discharge end of the chute rests upon the conveyor track, and is secured in position by pawl 8$^c$. The discharge fingers 8$^f$ pass through the notches 10$^f$ which are cut in the reel angles 10$^a$.

The outer sides of the notches 10$^f$ which face toward the advancing end of the can are preferably inclined outwardly at an angle of about 60° from the horizontal base of the angle as shown at 10$^h$. This insures that a can in crossing the notches will not catch on or engage the notches. The outwardly inclined sides of the notches may also be bevelled as at 10$^h$ to facilitate the sliding of the cans thereby. This is desirable, but ordinarily cans moving longitudinally of the angle bars 10$^a$ will not catch on the outwardly inclined sides of the notches.

Each angle bar 10$^a$ of the reel is notched as described adjacent each discharge opening. This construction obviates the necessity of transferring the cans from one machine to another, (as in companion case Serial No. 181,498) and eliminates the additional amount of handling, which is necessary in a double machine, as the cans in this machine when once fed in can remain in the same tank until such time as the albumen in the milk has received sufficient process to cause coagulation to be carried on to the desired degree, and then removed through one of the five openings, and the cans are then conveyed direct to the elevator of the sterilizer. This reduction in handling of cans in gravity runways (thus reducing to a minimum the bumping of the cans, either one against another, or against abutments or conveyor flights) is very desirable, as such rough handling of the cans is likely to cause leaks in the soldered seams of the cans.

An ordinarily detachable link belt 11, is used for conveying the cans through the canway 6 from the discharge inlet to the elevator of the sterilizer. This has no attachments, and as the cans roll down the curved discharge chute 8, they are free to roll along this chain, until they come to rest between two of the raised portions of such chain, and are then conveyed to their destination.

In this apparatus to change the point of discharge it is only necessary to set the discharge chute 8 at the desired opening; and to do this requires but a few seconds.

In a machine of this type, it is desirable that the water level in the machine be carried as high as possible, due to the use of plurality of zones of varying degree of heat. It is comparatively easy to maintain the temperature in these zones if they are substantially filled with water, but it is not easy to do so if filled with steam, as it will drift from one end of the machine to the other, and through small openings. Therefore, it is desirable that the discharge of the cans be close to the top of the machine, which desirable feature is provided by the present invention.

I do not herein claim the apparatus described for performing the method of processing condensed or evaporated milk in hermetically sealed containers, as that forms the subject matter of companion application (Case 7463) to be filed in accordance with official requirement for division.

I claim:

1. In combination with a tank or chamber having a plurality of outlets, a canway beside the chamber and extending adjacent the outlets; an adjustable chute or switch having an outer end adapted to rest upon the canway opposite any one of the outlets while its inner end extends into the tank through the adjacent outlet; and means for detachably attaching the base of the chute to the canway; said tank having studs beside the outlets, and said chute having lugs on its sides to engage the studs, and nuts on the studs to secure the lugs.

2. In cooking apparatus, a tank having a plurality of outlet openings; a spiral canway in the tank and a reel having longitudinal bars for propelling cans through the canway, said bars having a plurality of notches where they register with the outlet openings, said notches having their outer sides inclined outwardly; and a discharge chute adapted to be adjusted to any outlet opening and having a plurality of fingers on its inner end adapted to register with the notches in the bars to discharge the cans from the reel.

3. In cooking apparatus; a tank having a plurality of outlet openings; a spiral canway in the tank, and a reel having longitudinal bars for propelling cans through the canway, said bars having a plurality of notches where they register with the outlet openings; the sides of the notches being tapered or inclined outwardly in the direction in which the cans move endwise of the bars; and a discharge chute adapted to be adjusted to any outlet opening and having a plurality of tapered fingers on its inner end adapted to register with the slots or notches in the bars to discharge the cans.

4. In cooking apparatus, a tank having a plurality of outlet openings; a spiral canway in the tank, and a reel having longitudinal bars for propelling cans through the canway; the said bars having a plurality of notches where they register with the outlet openings, said notches having their outer sides inclined outwardly; a discharge chute adapted to be adjusted to any outlet opening and having a plurality of fingers on its inner end adapted to register with the notches in the bars as the reel rotates to discharge the cans; said chute having an arched outer end adapted to rest upon the canway and provided with a detent for engaging the canway to hold it in position thereon.

5. In cooking apparatus, a tank having a plurality of outlet openings; a spiral canway in the tank, and a reel having longitudinal bars for propelling cans through the canway; the said bars being notched or slotted where they register with the outlet openings; a discharge chute adapted to be adjusted to any outlet opening and having fingers on its inner end adapted to register with the slots or notches in the bars as the reel rotates to discharge the cans; the chute having lugs on its opposite sides near its inner end adapted to engage studs on the tank, and studs on the tank adapted to engage the lugs on the chute to hold the same in position.

6. In cooking apparatus, a tank having a plurality of outlet openings; a spiral canway in the tank, and a reel having longitudinal bars for propelling cans through the canway; the said bars being notched or slotted where they register with the outlet openings; a discharge chute adapted to be adjusted to any outlet opening and having fingers on its inner end adapted to register with the slots or notches in the bars as the reel rotates to discharge the cans; said chute having an arched end adapted to rest upon the canway and provided with a detent for engaging the canway to hold it in position thereon; said chute having lugs on its opposite sides near its inner end adapted to engage studs on the tank, and studs on the tank adapted to engage the lugs on the chute to hold the same in position.

7. In cooking apparatus, a tank having an outlet opening; a spiral canway in the tank and a reel having longitudinal bars for propelling cans through the canway, said bars being notched or slotted where they register with the outlet opening; and a discharge chute having fingers on its inner end adapted to register with the slots or notches in the bars to discharge the cans from the reel, the outer edges of the notches in the bars being tapered or inclined outwardly in the direction in which the cans move endwise of the bar; and the fingers on the chute being entered between the notches on the bars when the chute is in position.

8. In cooking apparatus, a spiral canway and a reel provided with longtiudinal bars for propelling cans through the canway, said bars having notches at the point where the cans are to be discharged therefrom, said notches having their outer sides inclined outwardly; and means adapted to register with the notches in the bars to discharge the cans from the reel.

9. In cooking apparatus, a tank having an outlet; a spiral canway in the tank, and a reel provided with longitudinal bars having notches at points adjacent the outlet opening, the outer edges of said notches being inclined outwardly in the direction in which the cans move endwise of the bars; and means adapted to project into the notches and discharge the cans from the bars.

10. In cooking apparatus, a spiral canway, a reel provided with longitudinal bars for propelling cans through the canway, said bars having a plurality of notches at points where the cans are to be discharged from the canway, the outer edges of the notches in the bars being tapered or inclined outwardly in the direction in which the cans move endwise of the bars; and means adapted to project into the notches on the bars and discharge the cans therefrom.

In testimony that I claim the foregoing as my own, I affix my signature.

ALBERT R. THOMPSON.